United States Patent
Lacy et al.

(10) Patent No.: US 7,357,358 B2
(45) Date of Patent: Apr. 15, 2008

(54) AIRCRAFT LEADING EDGE DEVICE SYSTEMS AND CORRESPONDING SIZING METHODS

(75) Inventors: Douglas S. Lacy, Bothell, WA (US); Greg H. Wyatt, Kent, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/789,100

(22) Filed: Feb. 27, 2004

(65) Prior Publication Data

US 2005/0224662 A1 Oct. 13, 2005

(51) Int. Cl.
*B64C 3/50* (2006.01)

(52) U.S. Cl. .......................... 244/214; 244/198; 703/8

(58) Field of Classification Search ........ 244/213–219, 244/89, 90 A, 123, 124, 34 R–39, 45 R–49, 244/45 A, 34 A, 123.1; 703/8
See application file for complete search history.

(56) References Cited

U.S. PATENT DOCUMENTS

| | | | |
|---|---|---|---|
| 1,724,456 A | | 8/1929 | Crook |
| 1,770,575 A | | 7/1930 | Ksoll |
| 2,086,085 A | | 7/1937 | Lachmann et al. |
| 2,169,416 A | | 8/1939 | Griswold |
| 2,282,516 A | | 5/1942 | Hans et al. |
| 2,289,704 A | | 7/1942 | Grant |
| 2,319,383 A | | 5/1943 | Zap |
| 2,347,230 A | * | 4/1944 | Zuck ........................ 244/82 |
| 2,358,985 A | * | 9/1944 | McAndrew ................. 244/201 |
| 2,378,528 A | * | 6/1945 | Arsandaux ................. 244/219 |
| 2,383,102 A | | 8/1945 | Zap |
| 2,385,351 A | | 9/1945 | Davidsen |
| 2,387,492 A | | 10/1945 | Blaylock et al. |
| 2,389,274 A | | 11/1945 | Pearsall et al. |

(Continued)

FOREIGN PATENT DOCUMENTS

DE 387833 1/1924

(Continued)

OTHER PUBLICATIONS www.crgrp.net, "Morphing Aerostructure—An Overview", pp. 1-9.*

(Continued)

*Primary Examiner*—J. Woodrow Eldred
(74) *Attorney, Agent, or Firm*—Perkins Coie LLP

(57) ABSTRACT

Aircraft leading edge device systems and methods for sizing such systems are disclosed. In one embodiment, a spanwise lift coefficient distribution for an airfoil corresponding to at least one design condition and at least one aircraft angle of attack is identified, and a leading edge device chord length is sized to at least approximately achieve the selected spanwise lift coefficient distribution. In another embodiment, a spanwise distribution of aircraft angles of attack corresponding to local maximum lift coefficients for an airfoil operated at a design condition is identified, and a leading edge device chord length at each of a plurality of spanwise locations is sized to achieve the distribution of aircraft angles of attack corresponding to local maximum lift coefficients. In yet another embodiment, a leading edge device chord length is tapered in two, at least approximately opposite, spanwise directions.

20 Claims, 8 Drawing Sheets

U.S. PATENT DOCUMENTS

| | | | |
|---|---|---|---|
| 2,406,475 A | 8/1946 | Rogers | |
| 2,422,296 A * | 6/1947 | Flader et al. | 244/211 |
| 2,444,293 A | 6/1948 | Holt | |
| 2,458,900 A | 1/1949 | Erny | |
| 2,504,684 A * | 4/1950 | Harper | 244/218 |
| 2,518,854 A | 8/1950 | Badenoch | |
| 2,563,453 A | 8/1951 | Briend | |
| 2,652,812 A | 9/1953 | Fenzl | |
| 2,665,084 A | 1/1954 | Feeney et al. | |
| 2,851,229 A * | 9/1958 | Clark | 244/219 |
| 2,864,239 A | 12/1958 | Taylor | |
| 2,877,968 A | 3/1959 | Granan et al. | |
| 2,886,008 A | 5/1959 | Geyer et al. | |
| 2,891,740 A | 6/1959 | Campbell | |
| 2,892,312 A | 6/1959 | Allen et al. | |
| 2,899,152 A | 8/1959 | Weiland | |
| 2,912,190 A * | 11/1959 | MacDonough | 244/214 |
| 2,920,844 A | 1/1960 | Marshall et al. | |
| 2,938,680 A | 5/1960 | Lawrence et al. | |
| 2,990,144 A | 6/1961 | Hougland | |
| 2,990,145 A | 6/1961 | Hougland | |
| 3,013,748 A | 12/1961 | Westburg | |
| 3,089,666 A | 5/1963 | Quenzler | |
| 3,102,607 A | 9/1963 | Roberts | |
| 3,112,089 A | 11/1963 | Dornier | |
| 3,136,504 A | 6/1964 | Carr | |
| 3,166,271 A * | 1/1965 | Zuck | 244/7 C |
| 3,191,147 A | 6/1965 | Majendie | |
| 3,203,275 A | 8/1965 | Hoover | |
| 3,203,647 A | 8/1965 | Alvarez-Calderon | |
| 3,282,535 A | 11/1966 | Steiner | |
| 3,375,998 A | 4/1968 | Alvarez-Calderon | |
| 3,423,858 A | 1/1969 | Speno | |
| 3,447,763 A | 6/1969 | Allcock | |
| 3,463,418 A * | 8/1969 | Miksch | 244/200.1 |
| 3,504,870 A | 4/1970 | Cole et al. | |
| 3,528,632 A | 9/1970 | Miles et al. | |
| 3,539,133 A | 11/1970 | Robertson | |
| 3,556,439 A | 1/1971 | Autry et al. | |
| 3,587,311 A * | 6/1971 | Hays, Jr. | 73/180 |
| 3,589,648 A | 6/1971 | Gorham et al. | |
| 3,642,234 A | 2/1972 | Kamber et al. | |
| 3,653,611 A | 4/1972 | Trupp et al. | |
| 3,659,810 A | 5/1972 | Robertson | |
| 3,677,504 A | 7/1972 | Schwarzler | |
| 3,704,828 A | 12/1972 | Studer et al. | |
| 3,704,843 A | 12/1972 | Jenny | |
| 3,711,039 A * | 1/1973 | James | 244/214 |
| 3,730,459 A * | 5/1973 | Zuck | 244/48 |
| 3,743,219 A | 7/1973 | Gorges | |
| 3,767,140 A | 10/1973 | Johnson | |
| 3,794,276 A | 2/1974 | Maltby et al. | |
| 3,804,267 A | 4/1974 | Cook et al. | |
| 3,807,447 A | 4/1974 | Masuda | |
| 3,813,062 A * | 5/1974 | Prather | 244/16 |
| 3,827,658 A | 8/1974 | Hallworth | |
| 3,831,886 A | 8/1974 | Burdges et al. | |
| 3,836,099 A | 9/1974 | O'Neill et al. | |
| 3,837,601 A | 9/1974 | Cole | |
| 3,862,730 A | 1/1975 | Helney | |
| 3,874,617 A | 4/1975 | Johnson | |
| 3,897,029 A | 7/1975 | Calderon | |
| 3,904,152 A | 9/1975 | Hill | |
| 3,910,530 A | 10/1975 | James et al. | |
| 3,913,450 A | 10/1975 | MacGregir | |
| 3,917,192 A | 11/1975 | Alvarez-Calderon | |
| 3,931,374 A | 1/1976 | Moutet nee Layrisse et al. | |
| 3,941,334 A | 3/1976 | Cole | |
| 3,941,341 A | 3/1976 | Brogdon, Jr. | |
| 3,949,957 A | 4/1976 | Portier et al. | |
| 3,968,946 A | 7/1976 | Cole | |
| 3,985,319 A | 10/1976 | Dean et al. | |
| 3,987,983 A | 10/1976 | Cole | |
| 3,991,574 A | 11/1976 | Frazier | |
| 3,992,979 A | 11/1976 | Smith | |
| 3,993,584 A | 11/1976 | Owen et al. | |
| 3,994,451 A | 11/1976 | Cole | |
| 4,011,888 A | 3/1977 | Whelchel et al. | |
| 4,015,787 A | 4/1977 | Maieli et al. | |
| 4,106,730 A | 8/1978 | Spitzer et al. | |
| 4,117,996 A | 10/1978 | Sherman | |
| 4,120,470 A | 10/1978 | Whitener | |
| 4,131,253 A | 12/1978 | Zapel | |
| 4,146,200 A * | 3/1979 | Borzachillo | 244/75 R |
| 4,171,787 A | 10/1979 | Zapel | |
| 4,180,222 A | 12/1979 | Thornburg | |
| 4,181,275 A | 1/1980 | Moelter et al. | |
| 4,189,120 A * | 2/1980 | Wang | 244/214 |
| 4,189,121 A | 2/1980 | Harper et al. | |
| 4,189,122 A | 2/1980 | Miller | |
| 4,200,253 A | 4/1980 | Rowarth | |
| 4,202,519 A | 5/1980 | Fletcher | |
| 4,240,255 A | 12/1980 | Benilan | |
| 4,247,843 A | 1/1981 | Miller | |
| 4,262,868 A | 4/1981 | Dean | |
| 4,267,990 A * | 5/1981 | Staudacher | 244/52 |
| 4,275,942 A | 6/1981 | Steidl | |
| 4,283,029 A | 8/1981 | Rudolph | |
| 4,285,482 A | 8/1981 | Lewis | |
| 4,293,110 A * | 10/1981 | Middleton et al. | 244/199.1 |
| 4,312,486 A | 1/1982 | Mc Kinney | |
| 4,325,123 A | 4/1982 | Graham | |
| 4,351,502 A | 9/1982 | Statkus | |
| 4,353,517 A | 10/1982 | Rudolph | |
| 4,358,077 A * | 11/1982 | Coronel | 244/218 |
| 4,360,176 A | 11/1982 | Brown | |
| 4,363,098 A | 12/1982 | Buus et al. | |
| 4,365,774 A * | 12/1982 | Coronel | 244/46 |
| 4,368,937 A | 1/1983 | Palombo et al. | |
| 4,384,693 A | 5/1983 | Pauly | |
| 4,427,168 A | 1/1984 | Mc Kinney | |
| 4,441,675 A | 4/1984 | Boehringer | |
| 4,444,368 A | 4/1984 | Andrews | |
| 4,448,375 A | 5/1984 | Herndon | |
| 4,459,084 A | 7/1984 | Clark | |
| 4,461,449 A | 7/1984 | Turner | |
| 4,471,925 A * | 9/1984 | Kunz | 244/130 |
| 4,471,927 A | 9/1984 | Rudolph | |
| 4,472,780 A | 9/1984 | Chenoweth et al. | |
| 4,475,702 A | 10/1984 | Cole | |
| 4,479,620 A | 10/1984 | Rogers et al. | |
| 4,485,992 A | 12/1984 | Rao | |
| 4,496,121 A | 1/1985 | Berlin | |
| 4,498,646 A | 2/1985 | Proksch | |
| 4,528,775 A | 7/1985 | Einarsson | |
| 4,533,096 A | 8/1985 | Baker | |
| 4,542,869 A | 9/1985 | Brine | |
| 4,544,117 A | 10/1985 | Schuster | |
| 4,553,722 A | 11/1985 | Cole | |
| 4,575,030 A | 3/1986 | Gratzer | |
| 4,575,099 A | 3/1986 | Nash | |
| 4,576,347 A | 3/1986 | Opsahl | |
| 4,605,187 A | 8/1986 | Stephenson | |
| 4,637,573 A | 1/1987 | Perin | |
| 4,650,140 A | 3/1987 | Cole | |
| 4,691,879 A * | 9/1987 | Greene | 244/45 R |
| 4,700,911 A * | 10/1987 | Zimmer | 244/35 R |
| 4,702,441 A | 10/1987 | Wang | |
| 4,702,442 A | 10/1987 | Weiland et al. | |
| 4,706,913 A | 11/1987 | Cole | |
| 4,712,752 A | 12/1987 | Victor | |
| 4,717,097 A | 1/1988 | Sepstrup | |
| 4,720,066 A | 1/1988 | Renken et al. | |
| 4,729,528 A * | 3/1988 | Borzachillo | 244/90 R |

| | | | | | | |
|---|---|---|---|---|---|---|
| 4,747,375 A | 5/1988 | Williams | | 6,109,567 A | 8/2000 | Munoz |
| 4,784,355 A | 11/1988 | Brine | | 6,112,141 A | 8/2000 | Briffe |
| 4,786,013 A | 11/1988 | Pohl | | 6,145,791 A * | 11/2000 | Diller et al. ............... 244/215 |
| 4,789,119 A | 12/1988 | Bellego et al. | | 6,152,405 A | 11/2000 | Muller et al. |
| 4,796,192 A * | 1/1989 | Lewis ....................... 701/124 | | 6,161,801 A | 12/2000 | Kelm |
| 4,823,836 A | 4/1989 | Bachmann et al. | | 6,164,598 A * | 12/2000 | Young et al. ............... 244/212 |
| 4,838,503 A | 6/1989 | Williams et al. | | 6,173,924 B1 * | 1/2001 | Young et al. ............... 244/215 |
| 4,856,735 A | 8/1989 | Lotz | | 6,188,937 B1 | 2/2001 | Sherry |
| 4,860,007 A | 8/1989 | Konicke | | 6,189,837 B1 | 2/2001 | Matthews |
| 4,867,394 A | 9/1989 | Patterson, Jr. et al. | | 6,213,433 B1 | 4/2001 | Gruensfelder |
| 4,892,274 A | 1/1990 | Pohl et al. | | 6,227,498 B1 | 5/2001 | Arata |
| 4,899,284 A | 2/1990 | Lewis | | 6,244,542 B1 * | 6/2001 | Young et al. ............... 244/213 |
| 4,962,902 A | 10/1990 | Fortes | | 6,293,497 B1 | 9/2001 | Kelley-Wickemeyer |
| 5,039,032 A | 8/1991 | Rudolph | | 6,328,265 B1 | 12/2001 | Dizdarevic |
| 5,046,688 A * | 9/1991 | Woods ....................... 244/123 | | 6,349,798 B1 | 2/2002 | McKay |
| 5,050,081 A | 9/1991 | Abbott et al. | | 6,349,903 B2 | 2/2002 | Calon et al. |
| 5,056,741 A * | 10/1991 | Bliesner et al. ............ 244/214 | | 6,364,254 B1 | 4/2002 | May |
| 5,074,495 A | 12/1991 | Raymond | | 6,375,126 B1 | 4/2002 | Sakurai |
| 5,082,207 A * | 1/1992 | Tulinius ................... 244/76 R | | 6,382,566 B1 | 5/2002 | Ferrel et al. |
| 5,082,208 A | 1/1992 | Matich | | 6,389,333 B1 | 5/2002 | Hansman |
| 5,088,665 A | 2/1992 | Vijgen | | 6,431,498 B1 * | 8/2002 | Watts et al. ............... 244/198 |
| 5,094,411 A * | 3/1992 | Rao ........................... 244/214 | | 6,439,512 B1 | 8/2002 | Hart |
| 5,094,412 A | 3/1992 | Narramore | | 6,443,394 B1 | 9/2002 | Weisend |
| 5,100,082 A | 3/1992 | Archung | | 6,450,457 B1 | 9/2002 | Sharp |
| 5,114,100 A | 5/1992 | Rudolph | | 6,464,175 B2 | 10/2002 | Yada et al. |
| 5,129,597 A | 7/1992 | Manthey | | 6,466,141 B1 | 10/2002 | McKay et al. |
| 5,158,252 A | 10/1992 | Sakurai | | 6,478,541 B1 * | 11/2002 | Charles et al. ............... 416/23 |
| 5,167,383 A | 12/1992 | Nozaki | | 6,481,667 B1 | 11/2002 | Ho |
| 5,203,619 A | 4/1993 | Welsch | | 6,484,969 B2 | 11/2002 | Sprenger |
| 5,207,400 A | 5/1993 | Jennings | | 6,499,577 B2 | 12/2002 | Kitamoto et al. |
| 5,244,269 A | 9/1993 | Harriehausen | | 6,547,183 B2 | 4/2003 | Farnsworth |
| 5,259,293 A | 11/1993 | Brunner | | 6,554,229 B1 | 4/2003 | Lam |
| 5,280,863 A * | 1/1994 | Schmittle ....................... 244/48 | | 6,561,463 B1 | 5/2003 | Yount et al. |
| 5,282,591 A * | 2/1994 | Walters et al. ........... 244/199.1 | | 6,591,169 B2 | 7/2003 | Jones |
| 5,351,914 A | 10/1994 | Nagao | | 6,598,829 B2 | 7/2003 | Kamstra |
| 5,388,788 A | 2/1995 | Rudolph | | 6,598,834 B2 | 7/2003 | Nettle |
| 5,420,582 A | 5/1995 | Kubbat | | 6,601,801 B1 | 8/2003 | Prow |
| 5,441,218 A | 8/1995 | Mueller | | 6,622,972 B2 * | 9/2003 | Urnes et al. ............... 244/194 |
| 5,474,265 A | 12/1995 | Capbern | | 6,622,974 B1 * | 9/2003 | Dockter et al. ............ 244/219 |
| 5,493,497 A | 2/1996 | Buus | | 6,625,982 B2 | 9/2003 | Van Den Bossche |
| 5,535,852 A | 7/1996 | Bishop | | 6,644,599 B2 | 11/2003 | Perez |
| 5,542,684 A | 8/1996 | Squirrell | | 6,651,930 B1 | 11/2003 | Gautier et al. |
| 5,544,847 A | 8/1996 | Bliesner | | 6,729,583 B2 | 5/2004 | Milliere et al. |
| 5,564,655 A | 10/1996 | Garland et al. | | 6,745,113 B2 | 6/2004 | Griffin |
| 5,600,220 A | 2/1997 | Thoraval | | 6,755,375 B2 | 6/2004 | Trikha |
| 5,609,020 A | 3/1997 | Jackson | | 6,796,526 B2 | 9/2004 | Boehringer |
| 5,680,124 A | 10/1997 | Bedell | | 6,796,534 B2 | 9/2004 | Beyer |
| 5,681,014 A * | 10/1997 | Palmer ....................... 244/219 | | 6,799,739 B1 | 10/2004 | Jones |
| 5,686,907 A | 11/1997 | Bedell | | 6,802,475 B2 | 10/2004 | Davies et al. |
| 5,715,163 A | 2/1998 | Bang | | 6,824,099 B1 | 11/2004 | Jones |
| 5,735,485 A | 4/1998 | Ciprian et al. | | 6,843,452 B1 | 1/2005 | Vassberg et al. |
| 5,740,991 A | 4/1998 | Gleine et al. | | 6,860,452 B2 | 3/2005 | Bacon et al. |
| 5,743,490 A | 4/1998 | Gillingham | | 6,870,490 B2 | 3/2005 | Sherry et al. |
| 5,746,490 A | 5/1998 | Domenig | | 6,978,971 B1 | 12/2005 | Dun |
| 5,788,190 A | 8/1998 | Siers | | 6,981,676 B2 | 1/2006 | Milliere |
| 5,839,698 A | 11/1998 | Moppert | | 7,007,897 B2 | 3/2006 | Wingett et al. |
| 5,875,998 A | 3/1999 | Gleine | | 7,028,948 B2 | 4/2006 | Pitt |
| 5,915,653 A | 6/1999 | Koppelman | | 7,048,228 B2 | 5/2006 | Vassberg et al. |
| 5,921,506 A * | 7/1999 | Appa ........................... 244/219 | | 7,048,234 B2 | 5/2006 | Recksiek et al. |
| 5,927,656 A | 7/1999 | Hinkleman | | 7,048,235 B2 | 5/2006 | McLean et al. |
| 5,934,615 A | 8/1999 | Treichler | | 7,051,982 B1 | 5/2006 | Johnson |
| 5,978,715 A | 11/1999 | Briffe | | 7,059,563 B2 | 6/2006 | Huynh |
| 5,984,230 A * | 11/1999 | Orazi ......................... 244/39 | | 2001/0006207 A1 | 7/2001 | Caton et al. |
| 6,015,117 A * | 1/2000 | Broadbent ................. 244/214 | | 2002/0046087 A1 | 4/2002 | Hey |
| 6,033,180 A * | 3/2000 | Machida ...................... 416/23 | | 2002/0074459 A1 * | 6/2002 | Gleine et al. ............... 244/214 |
| 6,045,204 A | 4/2000 | Frazier | | 2002/0100842 A1 | 8/2002 | Perez |
| 6,057,786 A | 5/2000 | Briffe | | 2002/0184885 A1 | 12/2002 | Blot-Carretero et al. |
| 6,073,624 A | 6/2000 | Laurent | | 2003/0058134 A1 | 3/2003 | Sherry |
| 6,076,767 A | 6/2000 | Farley et al. | | 2003/0127569 A1 | 7/2003 | Bacon et al. |
| 6,076,776 A | 6/2000 | Breitbach | | 2003/0132860 A1 | 7/2003 | Feyereisen |
| 6,079,672 A | 6/2000 | Lam et al. | | 2003/0197097 A1* | 10/2003 | Wakayama ................. 244/215 |
| 6,082,679 A | 7/2000 | Crouch et al. | | 2003/0230677 A1 | 12/2003 | Milliere |
| 6,085,129 A | 7/2000 | Schardt | | 2004/0004162 A1 | 1/2004 | Beyer |

| | | | |
|---|---|---|---|
| 2004/0016556 | A1 | 1/2004 | Barber |
| 2004/0059474 | A1 | 3/2004 | Boorman |
| 2004/0195464 | A1 | 10/2004 | Vassberg et al. |
| 2004/0217575 | A1 | 11/2004 | Beaujot et al. |
| 2004/0245386 | A1 | 12/2004 | Huynh |
| 2005/0011994 | A1 | 1/2005 | Sakurai et al. |
| 2005/0017126 | A1 | 1/2005 | McLean et al. |
| 2005/0045765 | A1* | 3/2005 | Pitt .................. 244/46 |
| 2005/0061922 | A1 | 3/2005 | Milliere |
| 2005/0109876 | A1 | 5/2005 | Jones |
| 2005/0151028 | A1 | 7/2005 | Pohl et al. |
| 2005/0171652 | A1 | 8/2005 | Speer |
| 2005/0242234 | A1 | 11/2005 | Mahmulyin |
| 2005/0274847 | A1* | 12/2005 | Charron .............. 244/123.1 |
| 2006/0000952 | A1 | 1/2006 | Rampton et al. |
| 2006/0038086 | A1 | 2/2006 | Reckzeh |
| 2006/0049308 | A1 | 3/2006 | Good et al. |
| 2006/0102803 | A1 | 5/2006 | Speer |
| 2006/0226297 | A1 | 10/2006 | Perez-Sanchex |
| 2006/0245882 | A1 | 11/2006 | Khan et al. |

FOREIGN PATENT DOCUMENTS

| | | |
|---|---|---|
| DE | 1129379 | 5/1962 |
| EP | 0100775 A1 | 2/1984 |
| EP | 0 103 038 | 3/1984 |
| EP | 0 370 640 | 5/1990 |
| EP | 0 483 504 A1 | 5/1992 |
| EP | 0 489 521 | 6/1992 |
| EP | 0781704 A1 | 2/1997 |
| EP | 0 947 421 | 10/1999 |
| EP | 1010616 A2 * | 12/1999 |
| EP | 1338506 | 8/2003 |
| EP | 1 547 917 A1 | 6/2005 |
| FR | 705155 | 8/1931 |
| FR | 984443 | 7/1951 |
| FR | 56121 | 9/1952 |
| FR | 57988 | 9/1953 |
| FR | 58273 | 11/1953 |
| GB | 886136 | 1/1962 |
| GB | 1181991 A | 2/1970 |
| WO | WO-02/24530 | 3/2002 |

OTHER PUBLICATIONS

"Morphing Aircraft Structures"—Raytheon, www.defense-update.com, pp. 1-3.*
"Morphing aircraft Structure"—Penn State Univ, www.personal.psu.edu/users/d/s/dsr134/mas/Cellular.html, pp. 1-3.*
"Adaptive Aircraft: No Flight of Fancy?" Research into using exotic means of making wings change shape in-lfight looks promising, though still a long way from reality, Business Week Online, Jan. 7, 2003, pp. 1-3.*
"Aero-Space Research & Technology", Space Systems, Sep. 1, 2001, pp. 1-28.*
Flap (aircraft). Wikipedia, The Free Encyclopedia. Aug. 3, 2006, 10:18 UTC. Wikimedia Foundation, Inc. Aug. 5, 2006 <http://en.wikipedia.org/w/index.php?title=Flap_%28aircraft%29&oldid=67413665>.*
"Slats." Wikipedia, The Free Encyclopedia. Jun. 27, 2006, 12:32 UTC. Wikimedia Foundation, Inc. Aug. 5, 2006 <http://en.wikipedia.org/w/index.php?title=Slats&oldid=60827639>.*
U.S. Appl. No. 10/454,417, Neal V. Huynh.
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
U.S. Appl. No. 60/475,828, Kevin W. Beyer.
Boeing, 777 Aircraft Maintenance Manual, Sep. 5, 2002 (p. 39).
777 Transmission—Typical, 777 Maintenance Manual, Publication Date: Circa 1994 (1 page).
European Search Report for European Patent Application No. EP 03 07 7840, The Boeing Company, Nov. 4, 2003 (2 pgs).
International Search Report, PCT/US03/19724/ Sep. 11, 2003, 5 pages.
A340 Flight Controls, SAE Presentation, Publication Date: Circa 1995 (1 page).
777 High Lift System, 777 Maintenance Manual, Publication Date: Circa 1994 (1 page).
MOOG, Component Maintenance Manual, May 1994 (2 pages).
NIU, Chen-Yen, Airframe Structural Design, Chen-Yeun Niu, Conmilit Press, 1988 (1 page).
Drela, Mark, "Design and Optimization Method for Multi-Element Airfoils," MIT Department of Aeronautics and Astronautics, Copyright 1993 American Institute of Aeronautics and Astronautics, Inc. (pgs 1-11).
A320 Hinterkantem-Klappen-Verstell System, Trailing Edge Flap System, SAE Presentation, Publication Date: Circa 1990 (1 page).
Flap Drive System, 777 Maintenance Manual, Publication Date: Circa 1994 (1 page).
Flap Transmission and Support, 777 Maintenance Manual, Publication Date: Circa 1994 (1 page).
U.S. Appl. No. 10/671,435, Kelley-Wickemyer.
U.S. Appl. No. 10/770,256, Speer.
International Search Report for PCT/US2005/005233; Applicant: The Boeing Company; European Patent Office; dated Jun. 1, 2005 (3 pgs).
Drela, M., "Optimization Techniques In Airfoil Design," MIT Aero & Astro, 29 pages, date unknown.
Hansen, H., "Application of Mini-Trailing-Edge Devices in the Awiator Project," Airbus Deutschland, EGAG, Hunefeldstr. 1-5, D-28199 Bremen, Germany, 9 pages, Jan. 7, 2003.
Junkers JU 52/3M (2 pages); http://www.wpafb.af.mil/museum/outdoor/od16 [Accessed Aug. 7, 2003].
Petrov, A. V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical" AIRFOILS, 1957-1978 (4 pages); http://www.hq.nasa.gov/office/pao/History/SP-445/ch2-5.htm; [accessed Aug. 7, 2003].
TU 1-44 Canard, 1 pg, date unknown.
Whitcomb, Richard T., "Review of NASA Supercritical Airfoils," National Aeornautics and Space Administration, Aug. 1974 (pp. 8-18).
U.S. Appl. No. 09/714,026, filed Nov. 16, 2000, Sakurai.
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
Leaf Spring Retainer Seals; EMP, Inc.; 2 pgs, Accessed Apr. 27, 2005.

* cited by examiner

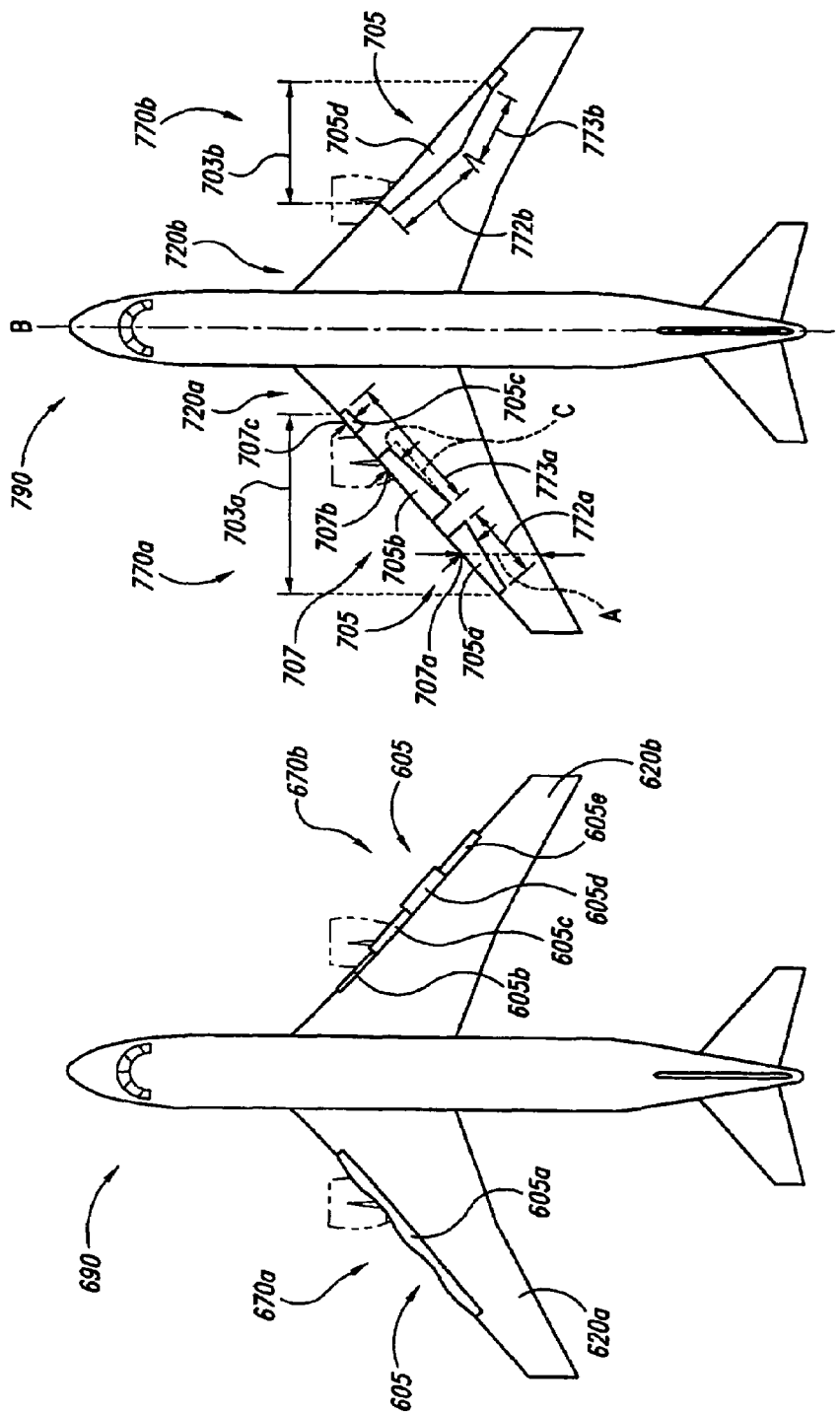

AIRCRAFT LEADING EDGE DEVICE SYSTEMS AND CORRESPONDING SIZING METHODS

TECHNICAL FIELD

The following disclosure relates generally to aircraft systems and corresponding sizing methods, for example, sizing a leading edge device arrangement on an aircraft airfoil.

BACKGROUND

Many aircraft use various leading edge devices to improve airfoil performance at high angles of attack. For example, modern commercial transport category aircraft generally have wings that are optimized for high speed cruise conditions. In order to improve takeoff and landing performance, these aircraft typically employ moveable leading edge devices that have at least one position, typically referred to as a retracted position, that provides optimum cruise performance, and one or more additional positions, typically referred to as extended positions, for low speed operations. The extended positions improve airflow over the airfoil during low speed operating conditions, allowing the aircraft to achieve higher angles of attack without stalling. This results in lower stall speeds for the specified configuration. Because operating speeds for takeoff and landing are typically based on a percentage of stall speed, these lower stall speeds result in improved takeoff and landing performance. Examples of typical leading edge devices include nose flaps, fixed slots, Kruger flaps, slats, and variable camber Kruger flaps. Other aircraft use leading edge devices to improve airfoil performance during other phases of operations. For example, fighter type aircraft often use leading edge devices during maneuvering flight.

FIG. 1 is a partially schematic top view of a conventional aircraft wing 1 with various control surfaces. The control surfaces include trailing edge high lift devices 4 (e.g., common flaps and fowler flaps), and leading edge devices 5 (such as those discussed above). The wing 1 also has a span 2, which is the distance from the fuselage 16 to the wing tip 17 (alternately, the span 2 can be measured from the wing tip 17 to an opposite wing tip and a semi-span can be defined as the distance from the wing tip 17 to a centerline of the fuselage 16). The leading edge devices 5 have a plurality of spanwise locations, each spanwise location having a corresponding leading edge device chord length. For purposes of illustration, one spanwise location 6 with a leading edge device chord length 7 is shown in FIG. 1, using a typical convention. In other conventions, the leading edge device chord length can be measured perpendicular to the direction that the span 2 is measured.

The wing 1 typically has at least one critical portion where the local maximum lift coefficient first occurs as the aircraft angle of attack is increased. As the aircraft angle of attack is further increased, the local maximum lift coefficient is exceeded on that portion of the wing 1, and that portion of the wing 1 becomes stalled. While the location of the critical portion of the wing can vary with design, on a typical modern swept wing transport category aircraft, it is not uncommon for the critical portion to be at approximately a 75% spanwise location (e.g., a distance from the fuselage 16 along the span equal to 75% of the distance from the fuselage 16 to the wing tip 17).

The typical design process, which yields the design depicted in FIG. 1, includes determining the amount of lift that the wing 1 must provide during various phases of flight, and an aircraft angle of attack that will be required to generate this lift. Because longer leading edge device chord lengths generally provide better high angle of attack performance, a leading edge device chord length that will support the required aircraft angle of attack on the critical portion of the wing 1 is determined. Generally, this leading edge device chord length determined for the critical portion of the airfoil is then used for all portions of all leading edge devices on the airfoil (i.e., each leading edge device has the same, constant chord length). Occasionally, a smaller chord length is used (for installation reasons) near the wing tip 17 due to spanwise wing taper or other structural constraints.

One aspect of the prior art design discussed above and shown in FIG. 1 is that the leading edge device chord length is optimized for the critical portion of the airfoil. A drawback of this aspect is that it creates a potentially inefficient design that unnecessarily increases the weight of the aircraft.

SUMMARY

The present invention is directed generally toward aircraft systems and corresponding sizing methods, for example, methods for sizing aircraft leading edge device arrangements on an airfoil. One aspect of the invention is directed toward a method for sizing an aircraft system that includes identifying a taper for at least two tapered portions of a leading edge device arrangement of an airfoil, with each tapered portion having a plurality of spanwise locations and with the leading edge device arrangement including at least a portion of at least one leading edge device. The method can further include selecting a leading edge device chord length or chord length fraction at each of a plurality of spanwise locations wherein the at least two tapered portions include a first tapered portion having a chord length or chord length fraction that tapers in a first spanwise direction and a second tapered portion having a chord length or chord length fraction that tapers in a second spanwise direction approximately opposite the first direction.

In another aspect of the invention, a method for sizing an aircraft system includes selecting at least one design condition for an airfoil and identifying a spanwise distribution of aircraft angles of attack corresponding to local maximum lift coefficients at a plurality of spanwise locations when the airfoil is operated at the at least one design condition. The method can further include sizing a leading edge device chord length at each of the plurality of spanwise locations to at least approximately match the identified spanwise distribution of aircraft angles of attack.

In yet another aspect of the invention, a method for sizing an aircraft system can include selecting at least one design condition for an airfoil and identifying a spanwise distribution of aircraft angles of attack corresponding to local maximum lift coefficients at a plurality of spanwise locations when the airfoil is operated at the at least one design condition. The method can further include determining one aircraft angle of attack that is at least approximately equal to the smallest aircraft angle of attack in the spanwise distribution of aircraft angles of attack and sizing a leading edge device chord length at each of a plurality of spanwise locations such that the local maximum lift coefficient at each spanwise location occurs at an aircraft angle of attack that is at least approximately equal to or greater than the one aircraft angle of attack.

In still another aspect of the invention, a method for sizing an aircraft system can include selecting at least one design condition for an airfoil and identifying at least one aircraft angle of attack. The method further includes selecting a spanwise lift coefficient distribution corresponding to the at least one design condition and the at least one aircraft angle of attack and determining a leading edge device chord length at each of a plurality of spanwise locations, such that when the airfoil is operated at the at least one design condition and the at least one aircraft angle of attack, the airfoil will provide at least approximately the selected spanwise lift coefficient distribution.

BRIEF DESCRIPTION OF THE DRAWINGS

FIG. 6 is a partially schematic top plan view of an aircraft wing with leading edge device arrangements configured in accordance with embodiments of the invention.

FIG. 7 is a partially schematic top plan view of an aircraft with leading edge device arrangements configured in accordance with embodiments of the invention.

DETAILED DESCRIPTION

The present disclosure describes aircraft leading edge devices and corresponding sizing methods. Several specific details of the invention are set forth in the following description and in FIGS. 2-11, to provide a thorough understanding of certain embodiments of the invention. One skilled in the art, however, will understand that the present invention may have additional embodiments, and that other embodiments of the invention may be practiced without several of the specific features explained in the following description.

Figure 1:
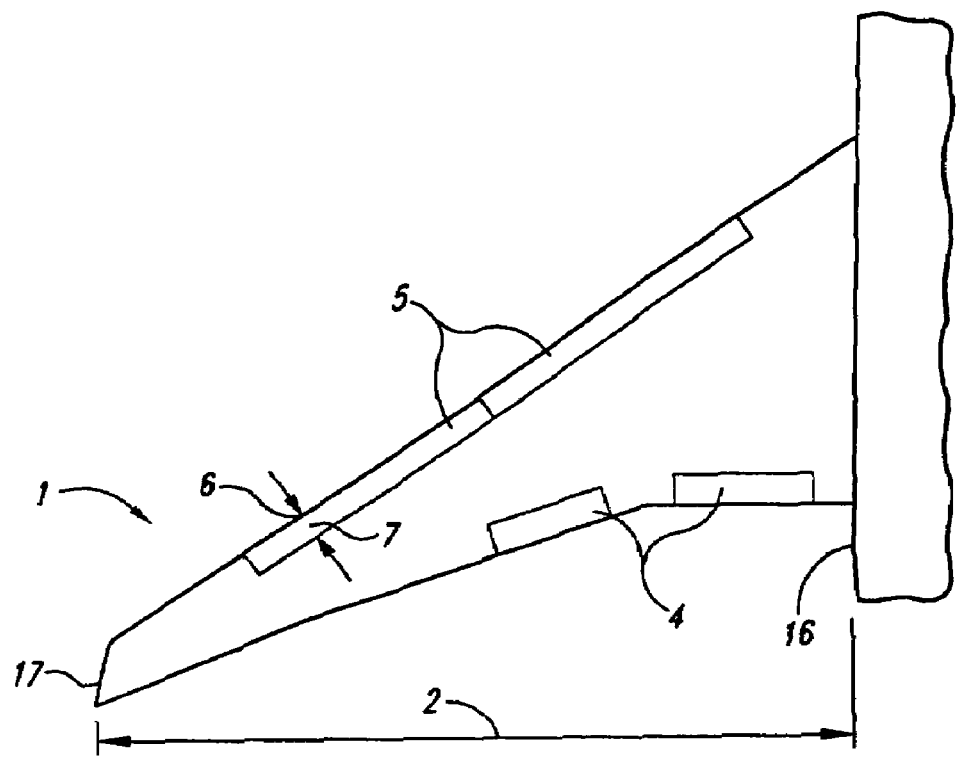
FIG. 1 is a partially schematic top plan view of a conventional aircraft wing in accordance with the prior art.
Figure 2:
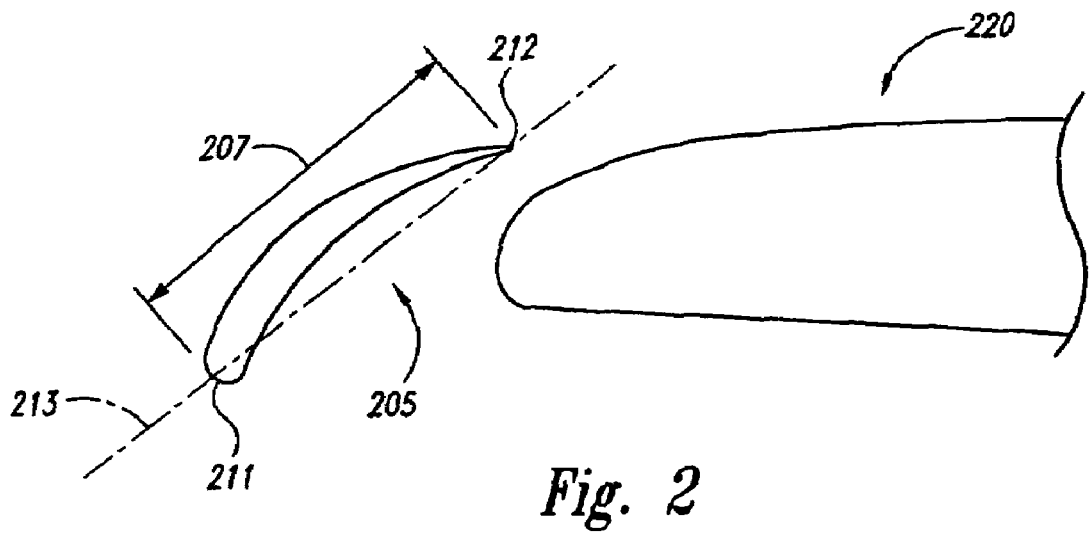
FIG. 2 is a partially schematic cross-sectional view of an unswept airfoil with a leading edge device in accordance with an embodiment of the invention.

FIG. 2 is a partially schematic cross-sectional view of a portion of an unswept aircraft airfoil 220 in accordance with certain embodiments of the invention. The aircraft airfoil section 220 can have a leading edge device 205. The leading edge device 205 can have a leading edge 211 and a trailing edge 212. A leading edge device chord line 213 extends through the centers of curvature of the leading edge 211 at a first intersection point and the trailing edge 212 at a second intersection point. The distance between the intersection points is the local leading edge device chord length 207. In other embodiments, the local leading edge device chord length can be the planform distance from a leading edge of the device to a trailing edge of the device as shown in FIGS. 1 and 7.

The leading edge device 205 can be fixed or moveable (e.g., deployable). When the leading edge device 205 is moveable, it generally has a retracted position and one or more extended positions. In the retracted position the leading edge device 205 can optimize the high subsonic or transonic cruise performance of the airfoil to which it is attached. In the extended positions the leading edge device 205 can increase the airfoil chord length, increase the airfoil camber, and/or create a leading edge slot of varying size for low speed conditions.

Figure 3:
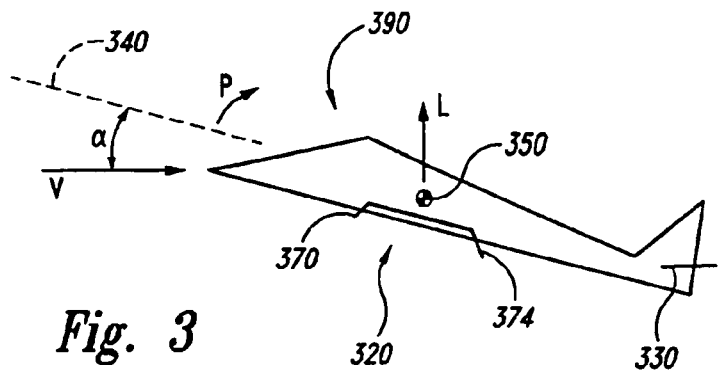
FIG. 3 is a partially schematic side view of an aircraft configured in accordance with an embodiment of the invention.

FIG. 3 is a partially schematic side view of an aircraft 390 with an airfoil 320 having both leading and trailing edge high lift arrangements, shown in FIG. 3 as a leading edge device arrangement 370 and a trailing edge device arrangement 374. The leading edge device arrangement 370 can include, singularly or in combination, various leading edge devices, for example, nose flaps, fixed slots, Kruger flaps, slats, variable camber Kruger flaps, and/or other types of leading edge high lift devices. The trailing edge device arrangement 374 can include, singularly or in combination, various types of trailing edge devices, for example, normal flaps, fowler flaps, and/or other types of trailing edge high lift devices. In other embodiments, the airfoil 320 can have other multiple leading edge device arrangements and/or other multiple trailing edge device arrangements. In still further embodiments, the leading edge device arrangements can be integrated with other airfoils, for example, an all-moveable horizontal tail 330.

The leading edge device arrangement 370 interacts with the flow field created by the relative motion of the aircraft 390 and the adjacent air mass, as does the rest of the external surface of the aircraft, including the trailing edge device arrangement 374 and the all-moveable horizontal tail 330. This interaction creates various forces (one is represented by arrow L in FIG. 3) and moments (one is represented by arrow P in FIG. 3) that can be summed about the aircraft center of gravity 350. These forces and moments can affect the state of the aircraft 390 and change various dynamic characteristics of the aircraft 390, including flight path, velocity (e.g., airspeed), acceleration (e.g., normal acceleration), and rates (e.g., yaw rate). This interaction can also be affected by the environmental characteristics of the air, including temperature, pressure, density, and various discontinuities (e.g., wind shears and gusts).

The physical characteristics of the aircraft 390 can also affect the interaction between the aircraft and the flow field. These physical characteristics can include aircraft weight, carriage of one or more external stores, various aircraft structural arrangements (e.g., conformal fuselage fuel tanks), moments of inertia created by internal loading (e.g., fuel distribution and the carriage of one or more internal stores), the dynamic movement of various control surfaces (e.g., the all-moveable horizontal tail 330), and aircraft configuration (e.g., the relative position of the leading and trailing edge devices, and if applicable, the position of a variable sweep wing). Accordingly, any design condition can include one or more of (a) a physical characteristic of the aircraft, (b) a characteristic of the environment in which the aircraft operates, and/or (c) a dynamic characteristic of the aircraft.

Angle of attack can also greatly affect the performance of the aircraft 390. The aircraft angle of attack (shown as a in FIG. 3) is the angular difference between an aircraft reference line 340 and the free stream relative wind (shown as arrow V in FIG. 3). The free stream relative wind V is the fluid flow created by the relative motion between the aircraft 390 and the fluid, where the fluid flow is unaffected by the aircraft (e.g., unaffected by up wash). The aircraft angle of attack a provides a generalized reference that allows a comparison of various parameters across the span of an airfoil, even though the local angle of attack may vary across the span due to factors including a wing twist, spanwise changes in airfoil type, and spanwise changes in configuration.

Figure 4:
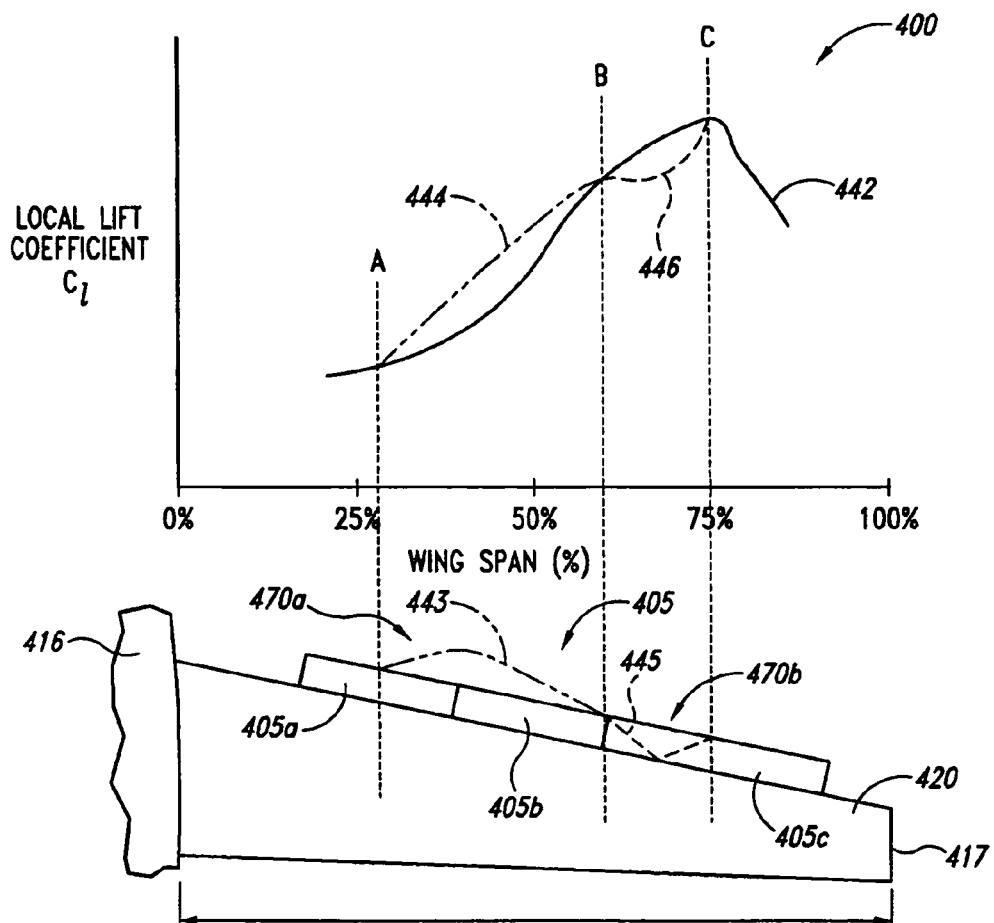
FIG. 4 is a graphical presentation of a spanwise local lift coefficient distribution corresponding to a design in accordance with an embodiment of the invention.

FIG. 4 is a graphical illustration of a spanwise local lift coefficient distribution 400 across a portion of a span 402 of an airfoil 420. The span extends from an aircraft fuselage 416 to a tip 417 of the airfoil 420. Spanwise locations are represented as a percent of the total span, with 0% being at the fuselage 416 and 100% being at the tip 417. A solid line 442 in FIG. 4 represents a typical lift coefficient distribution for a modern commercial transport category aircraft at a design condition and an aircraft angle of attack corresponding to the aircraft in a landing configuration, stabilized at an airspeed slightly above stall.

The spanwise portion of the airfoil 420 between points A and B includes a leading edge device arrangement 470a that in turn includes at least a portion of at least one leading edge device 405. In the particular example shown in FIG. 4, the spanwise portion between points A and B includes portions of two leading edge devices 405a, 405b. The chord length(s) of the leading edge device(s) can influence the lift coefficient distribution, especially at higher angles of attack. For example, if the leading edge device chord length of the leading edge device arrangement 470a is increased between points A and B (as shown by phantom line 443), the lift coefficients at the corresponding plurality of spanwise locations can be increased (as shown by phantom line 444). With other airfoil designs and leading edge device arrangements, at certain design conditions and aircraft angles of attack, increasing the leading edge device chord length can cause the lift coefficient to decrease.

The spanwise portion between points B and C has a leading edge device arrangement 470b with at least a portion of at least one leading edge device 405 (e.g., leading edge device 405c). If the leading edge device chord length of the leading edge device arrangement 470b is decreased between points B and C (as shown by dashed line 445), the lift coefficients at the corresponding plurality of spanwise locations can be decreased (as shown by dashed line 446). With other airfoil designs and leading edge device arrangements, at certain design conditions and aircraft angles of attack, decreasing the leading edge device chord length can cause the lift coefficient to increase. Accordingly, the leading edge device chord length can be tailored to achieve a selected lift distribution for a given design condition and a given aircraft angle of attack.

Figure 5:
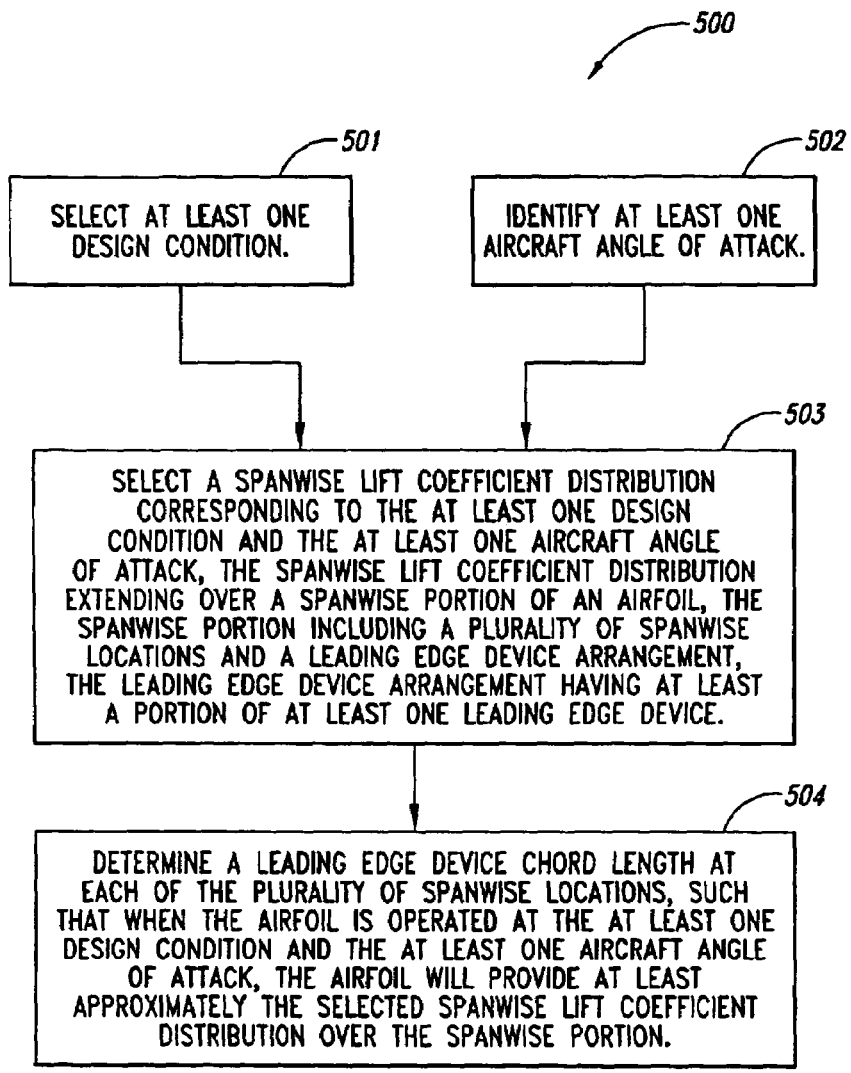
FIG. 5 is a flow chart illustrating a process for sizing an aircraft system in accordance with an embodiment of the invention.

FIG. 5 depicts a flow chart illustrating a process for sizing leading edge devices 500 that takes advantage of this characteristic. The process can include selecting at least one design condition (process portion 501) and identifying at least one aircraft angle of attack (process portion 502). The process can further include selecting a spanwise lift coefficient distribution corresponding to the at least one design condition and the at least one aircraft angle of attack (process portion 503). The spanwise lift coefficient distribution can extend over a spanwise portion of an airfoil that includes a plurality of spanwise locations and a leading edge device arrangement having at least a portion of at least one leading edge device. The process can still further include determining a leading edge device chord length at each of the plurality of spanwise locations, such that when the airfoil is operated at the at least one design condition and the at least one aircraft angle of attack, the airfoil will provide at least approximately the selected spanwise lift coefficient distribution over the spanwise portion (process portion 504). The process of determining the leading edge device chord length can include the use of computational fluid dynamics (CFD), wind tunnel testing, aircraft flight testing, and/or other design tools.

FIG. 6 is a partially schematic top plan view of an aircraft wing with a leading edge device arrangement developed in accordance with certain embodiments of the invention, for example, the process discussed above with reference to FIG. 5. The aircraft 690 includes a left wing, which includes a left airfoil 620a, and a right wing, which includes a right airfoil 620b. For purposes of illustration, two different types of leading edge device arrangements are shown in FIG. 6 on the airfoils 620a, 620b of a single aircraft 690. Accordingly, the left airfoil 620a shown in FIG. 6 includes a left leading edge device arrangement 670a, which includes at least a portion of at least one leading edge device 605 (one leading edge device 605a is shown as part of the left leading edge device arrangement 670a in FIG. 6). The left leading edge device arrangement 670a includes a distribution of leading edge device chord lengths that increases and decreases multiple times over the span of the leading edge device arrangement.

The right airfoil 620b shown in FIG. 6 includes a right leading edge device arrangement 670b. The right leading edge device arrangement 670b includes multiple leading edge devices, each having an approximately constant chord length (four leading edge devices 605b-605e are shown as part of the right leading edge device arrangement 670b in FIG. 6). These multiple leading edge devices 605b-605e can be arranged such that the leading edge device chord length varies across the span of the leading edge device arrangement 670b in a manner that at least approximates (or is at least approximately proportional to) the leading edge device chord length distribution determined in accordance with various embodiments of the invention (e.g., the process described above with reference to FIG. 5).

In other embodiments, the leading edge device chord length or chord length fraction (the ratio of the local leading edge device chord length to the local chord length of the airfoil) can be tapered in opposite spanwise directions, such that the taper varies in a manner at least approximately proportional to the leading edge device chord length distribution determined in accordance with various embodiments of the invention (e.g., the process shown above in FIG. 5) or for other reasons. Two examples of such leading edge device arrangements are shown in FIG. 7. Again, for purposes of illustration, the two examples are shown on the same aircraft 790, which includes a left wing having a left airfoil 720a, and a right wing having a right airfoil 720b.

The left airfoil 720a has a left spanwise portion 703a that includes a left leading edge device arrangement 770a. The left spanwise portion 703a includes a plurality of spanwise locations 707, each location having a corresponding leading edge device chord length. Three spanwise locations 707a-707c are shown in FIG. 7 with corresponding leading edge device chord lengths. In other embodiments, the left spanwise portion 703a has more or fewer spanwise locations 707. The left leading edge device arrangement 770a includes at least a portion of at least one leading edge device 705 (three leading edge devices 705a-705c are shown in FIG. 7). The left leading edge device arrangement 770a can include multiple tapered portions shown in FIG. 7 as a left first tapered portion 772a and a left second tapered portion 773a. In other embodiments, the left leading edge device arrangement has more or fewer tapered portions.

The left first tapered portion 772a includes a single leading edge device 705a and the left second tapered portion 773a includes two leading edge devices 705b, 705c. In certain embodiments, the taper of both the first and second tapered portions 772a, 773a can vary in a manner at least approximately proportional to the leading edge device chord length distribution described above. In other embodiments, the leading edge device arrangement 770a can be tapered for other reasons.

The leading edge device chord length influences the lift produced by an airfoil, at least in part, because of the effect it has on the chord length fraction. Therefore, the chord length fraction can be tapered in a similar manner to achieve the same effect as tapering the leading edge device chord length. For example, the far left leading edge device 705a can include a spanwise location 707a. The local leading edge device chord length at the spanwise location 707a is measured perpendicular to the leading edge. The local chord length of the airfoil 720a at the spanwise location 707a, depicted by line A, is measured parallel to the centerline of the aircraft, depicted by line B. The local chord length of the airfoil 720a can be the planform distance between the leading and trailing edges of the airfoil 720a, the distance between the centers of curvature of the leading and trailing edges of the airfoil 720a, or other reference distances commonly referred to as airfoil chord lengths, determined by known methods, and measured parallel to the centerline of the aircraft. Because the local leading edge device chord length decreases more rapidly than the local chord length of the airfoil 720a (for spanwise locations positioned progressively further outboard), the chord length fraction also decreases. Similarly, if the middle leading edge device 705b includes a constant leading edge device chord length, as depicted by dashed lines C, the chord length fraction decreases (for spanwise locations positioned progressively further inboard) because the local chord of the wing increases. Accordingly, tapering the chord length fraction can yield the same results as tapering the leading edge device chord length. The chord length fraction can also be tapered for other reasons.

The right airfoil 720b includes a right spanwise portion 703b that includes a right leading edge device arrangement 770b. The right spanwise portion 703b includes a plurality of spanwise locations, each location having a corresponding leading edge device chord length. The right leading edge device arrangement 770b includes at least a portion of at least one leading edge device 705 (e.g., leading edge device 705d). The right leading edge device arrangement 770b includes a right first tapered portion 772b and a right second tapered portion 773b, each tapered portion including a portion of the single leading edge device 705d. The taper of both the first and second tapered portions 772b, 773b can vary in a manner that is at least approximately proportional to the distribution described above (e.g., with reference to FIG. 5). In other embodiments, the leading edge device arrangements 770a, 770b can be tapered for other reasons. These reasons include reducing a surface area of the leading edge device arrangement and/or reducing the material required to produce the leading edge device arrangement.

Figure 8:
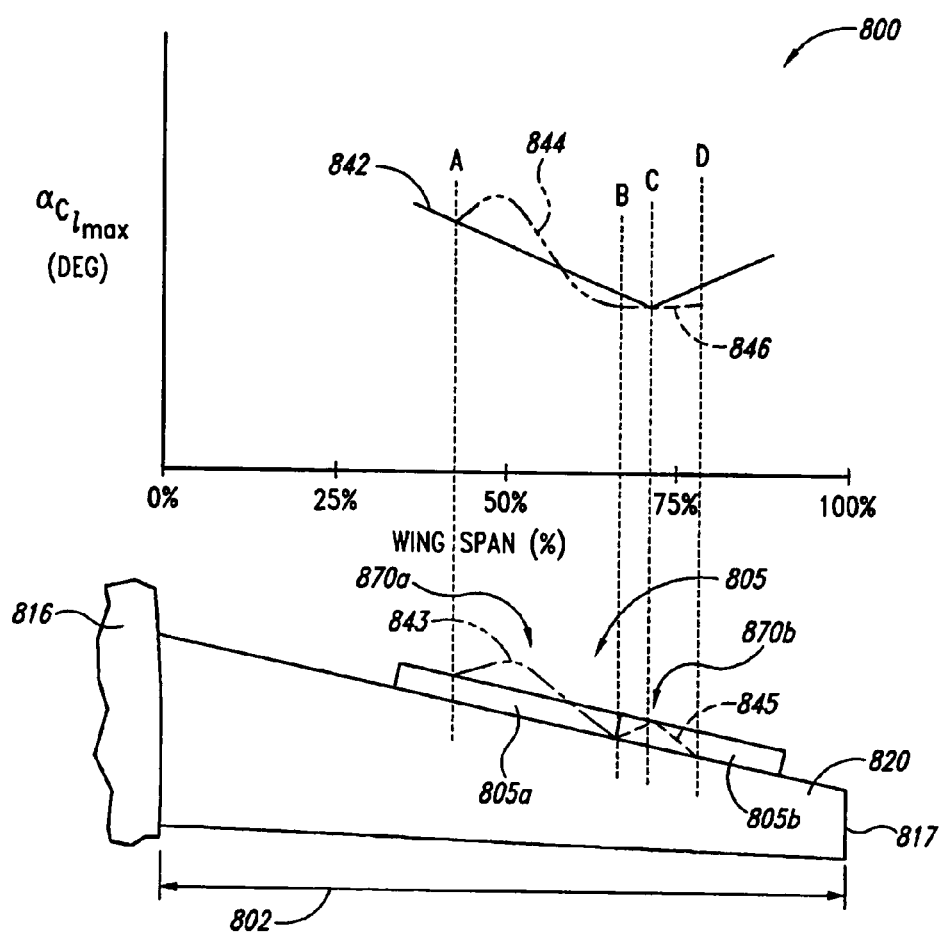
FIG. 8 is a graphical illustration of a spanwise distribution of aircraft angles of attack corresponding to local maximum lift coefficients designed in accordance with an embodiment of the invention.

In still further embodiments, the chord length distribution of one or more leading edge devices can be determined with reference to factors other than the local lift coefficient, as was described above with reference to FIGS. 4 and 5. For example, the leading edge chord length distribution can be determined with reference to a spanwise distribution of aircraft angles of attack at which local maximum lift coefficients occur. FIG. 8 illustrates an airfoil 820 having multiple leading edge device arrangements 870 (shown as arrangements 870a, 870b) and multiple leading edge devices 805 (shown as devices 805a, 805b). FIG. 8 also illustrates a corresponding spanwise distribution of $$\alpha_{c_{l_{max}}}$$

(the aircraft angle of attack at which the local lift coefficient is a maximum) as a function of spanwise location. The span of the airfoil 820 extends from an aircraft fuselage 816 to a tip 817 of the airfoil 820. Spanwise locations are represented as a percent of the total span with 0% being at the fuselage 816 and 100% being at the tip 817. A solid line 842 in FIG. 8 represents a typical distribution of $$\alpha_{c_{l_{max}}}$$

for a modern commercial transport category aircraft at a design condition, for example, at low altitude in a landing configuration. The chord length of the leading edge devices 805 can influence the distribution of aircraft angles of attack at which local maximum lift coefficients occur. For example, the spanwise portion between points A and B has a leading edge device arrangement 870a with at least a portion of leading edge device 805a. If the leading edge device chord length of the leading edge device arrangement is increased and decreased at various spanwise locations between points A and B (as shown by a phantom line 843), the aircraft angles of attack at which local maximum lift coefficients occur at the corresponding plurality of spanwise locations can be increased and decreased respectively (as shown by a phantom line 844).

In another embodiment, the leading edge device chord length distribution can be determined such that the local maximum lift coefficient at each spanwise location occurs at approximately the same aircraft angle of attack. For example, the spanwise portion between points B and D has a leading edge device arrangement 870b with at least a portion of leading edge device 805b. Point C corresponds to the point where the local maximum lift coefficient occurs at the smallest aircraft angle of attack. If the leading edge device chord length of the leading edge device arrangement is decreased at various spanwise locations between points B and C, and C and D (as shown by a dashed line 845), the local maximum lift coefficients at the corresponding plurality of spanwise locations will occur at least approximately at the same aircraft angle of attack (as shown by a dashed line 846). The result can be a leading edge device arrangement having a chord length distribution that tapers in opposing spanwise directions, generally similar to the arrangements described above with reference to FIG. 7.

Figure 9:
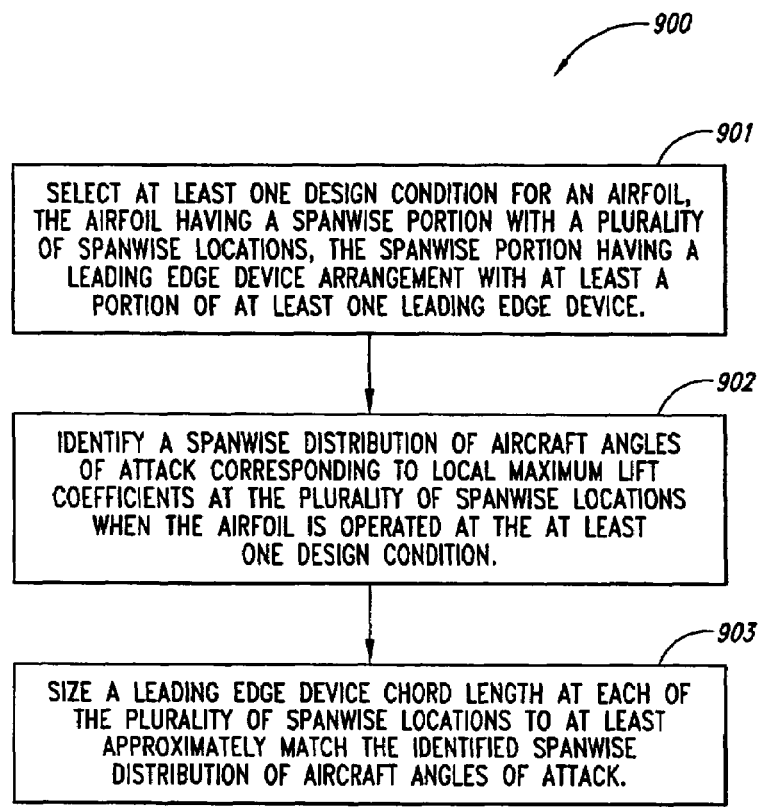
FIG. 9 is a flow chart illustrating a process for sizing an aircraft system in accordance with an embodiment of the invention.
Figure 10:
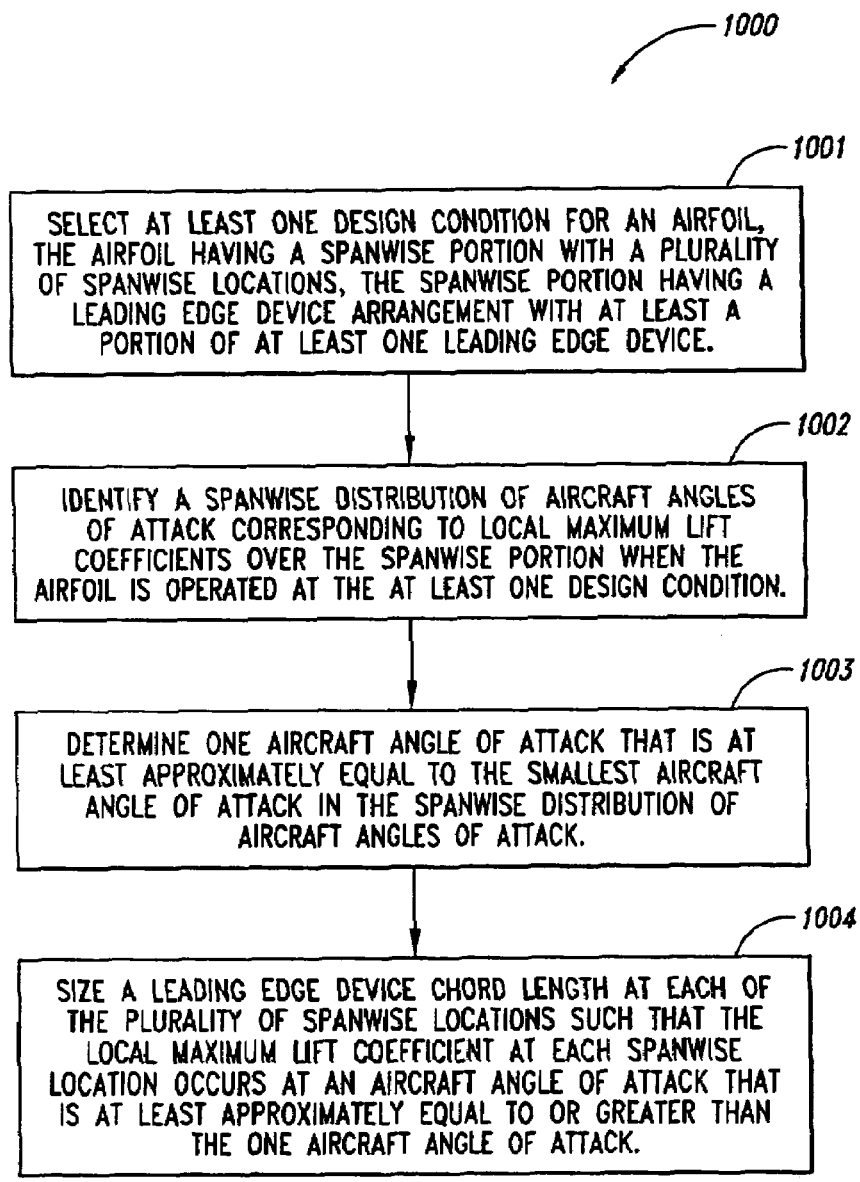
FIG. 10 is a flow chart illustrating a process for sizing an aircraft system in accordance with another embodiment of the invention.

FIGS. 9 and 10 depict flow charts illustrating processes for sizing leading edge devices that take advantage of the foregoing characteristic. Referring first to FIG. 9, a process 900 in accordance with one embodiment includes selecting at least one design condition for an airfoil (process portion 901). The airfoil can include a spanwise portion with a plurality of spanwise locations, the spanwise portion having a leading edge device arrangement with at least a portion of at least one leading edge device. The process can further include identifying a spanwise distribution of aircraft angles of attack corresponding to local maximum lift coefficients at the plurality of spanwise locations when the airfoil is operated at the at least one design condition (process portion 902).

In certain embodiments, the distribution of aircraft angles of attack can correspond to local maximum lift coefficients based on two-dimensional flow characteristics (no spanwise flow). For example, two-dimensional modeling may be sufficient when aircraft angles of attack greater than the lowest aircraft angle of attack that produces one or more local maximum lift coefficients are of little interest. In other embodiments, the distribution of aircraft angles of attack can correspond to local maximum lift coefficients based on three-dimensional flow characteristics, using techniques varying in complexity. Three-dimensional characteristics can be of particular interest where an aircraft is expected to maneuver at aircraft angles of attack above the lowest aircraft angle of attack that produces one or more local maximum lift coefficients. For example, three-dimensional characteristics can be important in aircraft where, including spanwise flow effects, the coefficient of lift continues to increase significantly on certain portions of the airfoil with increasing aircraft angles of attack, after other portions of the airfoil have stalled. The process can still further include sizing a leading edge device chord length at each of the plurality of spanwise locations to at least approximately match the identified spanwise distribution of aircraft angles of attack (process portion 903). As discussed above, spanwise tapering via a continuous taper or multiple leading edge devices with different but constant chord lengths can be used to vary the chord length of the leading edge device arrangement in a manner that is at least approximately proportional to the leading edge device chord length distribution.

In another embodiment shown in FIG. 10, a process for sizing an aircraft system 1000 can include selecting at least one design condition for an airfoil (process portion 1001). The airfoil can include a spanwise portion with a plurality of spanwise locations, the spanwise portion having a leading edge device arrangement with at least a portion of at least one leading edge device. The process can further include identifying a spanwise distribution of aircraft angles of attack corresponding to local maximum lift coefficients over the spanwise portion when the airfoil is operated at the at least one design condition (process portion 1002), and determining one aircraft angle of attack that is at least approximately equal to the smallest aircraft angle of attack in the spanwise distribution of aircraft angles of attack (process portion 1003). As discussed above, in certain embodiments, the distribution of aircraft angles of attack can correspond to local maximum lift coefficients based on two-dimensional flow or three-dimensional flow. The process can still further include sizing a leading edge device chord length at each of the plurality of spanwise locations such that the local maximum lift coefficient at each spanwise location occurs at an aircraft angle of attack that is at least approximately equal to or greater than the one aircraft angle of attack (process portion 1004). Also, as discussed above, spanwise tapering or multiple leading edge devices with constant chord lengths can be used to vary the chord length of the leading edge device arrangement in a manner that is at least approximately proportional to the sizing of the leading edge chord lengths at the plurality of spanwise locations.

Figure 11:
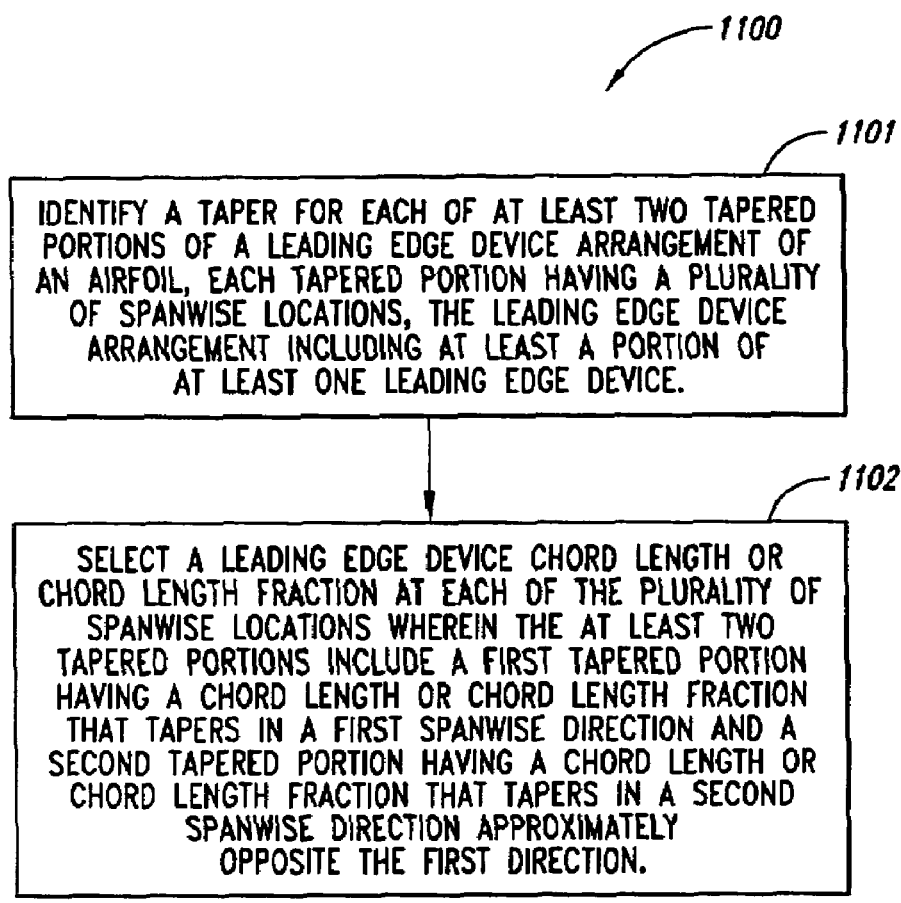
FIG. 11 is a flow chart illustrating a process for sizing an aircraft system in accordance with still another embodiment of the invention.

As discussed above with reference to FIG. 7, it can be desirable to taper the chord length of the leading edge device arrangement in at least two directions for various reasons. These reasons include reducing a surface area of the leading edge device arrangement and/or reducing the material required to produce the leading edge device arrangement. FIG. 11 is a flow chart illustrating a corresponding sizing process 1100, in accordance with another embodiment of the invention. The process 1100 can include identifying a taper for each of at least two tapered portions of a leading edge device arrangement of an airfoil. Each tapered portion can have a plurality of spanwise locations and the leading edge device arrangement can include at least a portion of at least one leading edge device (process portion 1101). The process can further include selecting a leading edge device chord length or chord length fraction at each of the plurality of spanwise locations wherein the at least two tapered portions include a first tapered portion having a chord length or chord length fraction that tapers in a first spanwise direction and a second tapered portion having a chord length or chord length fraction that tapers in a second spanwise direction at least approximately opposite the first direction (process portion 1102).

The leading edge device arrangement can be tapered over at least a portion of a single leading edge device or over at least a portion of two or more leading edge devices. In another embodiment of the invention, as discussed above, multiple leading edge devices with constant chord lengths can be arranged to create the tapering effect. In one embodiment of the invention, the leading edge device chord length is tapered in the first and second directions from larger lengths to smaller lengths. In another embodiment, the leading edge device chord length is tapered in the first and second directions from smaller lengths to larger lengths. In still other embodiments a taper can be selected and then the leading edge device chord length can be sized for the critical portion of the wing, as discussed above.

One feature of the foregoing embodiments, described above with reference to FIGS. 2-10, is that the chord length distribution of the leading edge device(s) across the spanwise portion of an airfoil can be used to achieve a desired lift coefficient distribution, modify a desired lift coefficient distribution, and/or control the distribution of aircraft angles of attack at which the local maximum lift coefficient occurs. This feature provides designers with the ability to (a) control which portion of the airfoil will stall first as aircraft angle of attack increases, (b) get the desired performance out of the airfoil, and/or (c) address other performance or stability and control issues. Additionally, in many cases a leading edge device chord length can be used at various spanwise locations over a leading edge device arrangement that is smaller than would normally be used on an airfoil designed in accordance with the prior art (e.g., as discussed above with reference to FIG. 1). Accordingly, less material is needed to produce the leading edge device arrangement, reducing the weight of the aircraft. The leading edge device arrangement can also have less surface area, which can result in lower aerodynamic loads on the leading edge device arrangement. This in turn can result in reduced actuator sizing requirements and less wear and tear on the aircraft structure. Ultimately, smaller leading edge device chord lengths can lead to cost and weight savings for both the manufacturer and the operator.

From the foregoing, it will be appreciated that specific embodiments of the invention have been described herein for purposes of illustration, but that various modifications may be made without deviating from the spirit and scope of the invention. Apparatuses and methods in accordance with further embodiments of the invention can include other combinations of the features described above. For example, the apparatuses and methods can be used on any airfoil, including airfoils that extend from a first wing tip to a second wing tip, uninterrupted by a fuselage. Additionally, the apparatuses and methods can apply to fixed leading edge devices and can be combined with other techniques for controlling lift on an airfoil, including the use of vortex generators, fences, and blown flaps. Any of the foregoing methods may be carried out manually or (in whole or in part) by a computer and/or computer-readable medium. Accordingly, the invention is not limited except by the following claims.

We claim:

1. An aircraft system comprising:
an airfoil having a spanwise portion, the spanwise portion having a plurality of spanwise locations; and
a leading edge device arrangement coupled to the spanwise portion, the leading edge device arrangement including at least a portion of at least one leading edge device, the at least one leading edge device in turn including at least a portion of a leading edge flap or leading edge slat, wherein a leading edge device chord length at each of the plurality of spanwise locations is at least approximately equal to the smallest leading edge device chord length required to provide a local maximum lift coefficient when the airfoil is operated at at least one selected design condition and a selected aircraft angle of attack.

2. The system of claim 1 wherein the leading edge device arrangement includes a plurality of leading edge devices, each leading edge device having an approximately constant chord length, and wherein the plurality of leading edge devices are arranged so that the approximately constant chord length of each leading edge device is at least approximately proportional to the smallest leading edge device chord length required to provide a local maximum lift coefficient at each of the plurality of spanwise locations when the airfoil is operated at the at least one selected design condition and the selected aircraft angle of attack.

3. The system of claim 1 wherein the leading edge device arrangement has at least two tapered portions, including:
a first tapered portion wherein the leading edge device chord length is tapered in a first spanwise direction; and
a second tapered portion wherein the leading edge device chord length is tapered in a second spanwise direction approximately opposite the first direction, the leading edge device chord length varying in a manner at least approximately the same as the manner in which the approximately smallest leading edge device chord length required to provide the local maximum lift coefficient varies across the spanwise portion.

4. The system of claim 1, further comprising an aircraft, the airfoil being coupled to the aircraft.

5. The system of claim 1 wherein the at least one selected design condition includes at least one of a physical characteristic of an aircraft, a dynamic characteristic of the aircraft, and a characteristic of an environment in which the aircraft operates.

6. The system of claim 1 wherein the at least one leading edge device is deployable, having a retracted position and at least one extended position.

7. An aircraft system comprising:
an airfoil having a spanwise portion, the spanwise portion having a plurality of spanwise locations; and
leading edge high lift means for increasing airfoil performance at high aircraft angles of attack positioned proximate to the spanwise portion wherein the leading edge high lift means includes at least a portion of a leading edge flap or a leading edge slat, and where in a high lift means chord length at each of the plurality of spanwise locations is at least approximately proportional to an approximately smallest high lift means chord length required to provide a local maximum lift coefficient when the airfoil is operated at at least one selected design condition and a selected aircraft angle of attack.

8. The system of claim 7 wherein the leading edge high lift means includes at least one leading edge device having at least two tapered portions tapered in opposite spanwise directions.

9. The system of claim 7, further comprising an aircraft, the airfoil being coupled to the aircraft.

10. The system of claim 7 wherein the at least one selected design condition includes at least one of a physical characteristic of an aircraft, a dynamic characteristic of the aircraft, and a characteristic of an environment in which the aircraft operates.

11. An aircraft system, comprising:
an airfoil having a spanwise portion, the spanwise portion having a plurality of spanwise locations; and
a leading edge device arrangement coupled to the spanwise portion, the leading edge device arrangement including at least a portion of at least one leading edge device, the at least one leading edge device in turn including at least a portion of a leading edge flap or leading edge slat, wherein a leading edge device chord length at each of the plurality of spanwise locations is at least approximately proportional to the smallest leading edge device chord length reguired to provide a local maximum lift coefficient when the airfoil is operated at at least one selected design condition and selected aircraft angle of attack, wherein the leading edge device arrangement has at least two tapered portions, including:
a first tapered portion wherein the leading edge device chord length is tapered in a first spanwise direction; and
a second tapered portion wherein the leading edge device chord length is tapered in a second spanwise direction approximately opposite the first direction, the leading edge device chord length varying in a manner at least approximately the same as the manner in which the leading edge device chord length at each location determined to provide the selected lift coefficient distribution varies across the spanwise portion.

12. The system of claim 11 wherein the leading edge device arrangement includes a plurality of leading edge devices, each leading edge device having an approximately constant chord length, and wherein the plurality of leading edge devices are arranged to be at least approximately proportional to the leading edge device chord length at each location determined to provide the selected lift coefficient distribution.

13. The system of claim 11, further comprising an aircraft, the airfoil being coupled to the aircraft.

14. The system of claim 11 wherein the at least one selected design condition includes at least one of a physical characteristic of an aircraft, a dynamic characteristic of the aircraft, and a characteristic of an environment in which the aircraft operates.

15. The system of claim 11 wherein the at least one leading edge device is deployable, having a retracted position and at least one extended position.

16. An aircraft system, comprising:
an airfoil having a spanwise portion, the spanwise portion having a plurality of spanwise locations; and
a leading edge device arrangement coupled to the spanwise portion, the leading edge device arrangement including at least a portion of at least one leading edge device, the at least one leading edge device in turn including at least a portion of a leading edge flap or leading edge slat, wherein a leading edge device chord length at each of the plurality of spanwise locations is at least approximately proportional to a leading edge device chord length at each location determined to provide a selected spanwise distribution of aircraft angles of attack corresponding to local maximum lift coefficients when the airfoil is operated at at least one selected design condition, wherein the leading edge device arrangement has at least two tapered portions, including:
a first tapered portion wherein the leading edge device chord length is tapered in a first spanwise direction; and
a second tapered portion wherein the leading edge device chord length is tapered in a second spanwise direction approximately opposite the first spanwise direction, the first and second portions having a combined distribution of chord lengths at least approximately the same as the determined leading edge device chord lengths.

17. The system of claim 16 wherein the leading edge device arrangement includes a plurality of leading edge devices, each leading edge device having an approximately constant chord length, and wherein the plurality of leading edge devices have a combined distribution of chord lengths at least approximately proportional to the determined leading edge device chord lengths at each spanwise location.

18. The system of claim 16, further comprising an aircraft, the airfoil being coupled to the aircraft.

19. The system of claim 16 wherein the at least one selected design condition includes at least one of a physical characteristic of an aircraft, a dynamic characteristic of the aircraft, and a characteristic of an environment in which the aircraft operates.

20. The system of claim 16 wherein the at least one leading edge device is deployable, having a retracted position and at least one extended position.

* * * * *

UNITED STATES PATENT AND TRADEMARK OFFICE
CERTIFICATE OF CORRECTION

PATENT NO. : 7,357,358 B2
APPLICATION NO. : 10/789100
DATED : April 15, 2008
INVENTOR(S) : Lacy et al.

It is certified that error appears in the above-identified patent and that said Letters Patent is hereby corrected as shown below:

On Page 2, in field (56), under "U.S. Patent Documents", in column 1, line 60, delete "Helney" and insert -- Heiney --, therefor.

On Page 2, in field (56), under "U.S. Patent Documents", in column 2, line 14, delete "244/75 R" and insert -- 244/225 --, therefor.

On Page 3, in field (56), under "U.S. Patent Documents", in column 1, line 15, delete "244/123" and insert -- 269/45 --, therefor.

On Page 3, in field (56), under "U.S. Patent Documents", in column 2, line 68, delete "Sherry" and insert -- Sherry et al. --, therefor.

On Page 4, in field (56), under "U.S. Patent Documents", in column 1, line 2, delete "Boorman" and insert -- Boorman et al. --, therefor.

On Page 4, in field (56), under "U.S. Patent Documents", in column 1, line 19, delete "Sanchex" and insert -- Sanchez --, therefor.

On Page 4, in field (56), under "U.S. Patent Documents", in column 1, line 6, delete "lfight" and insert -- flight --, therefor.

On Page 4, in field (56), under "U.S. Patent Documents", in column 1, line 30, delete "Wickemyer" and insert -- Wickemeyer --, therefor.

On Page 4, in field (56), under "U.S. Patent Documents" in column 1, line 51, delete "Aeornautics" and insert -- Aeronautics --, therefor.

UNITED STATES PATENT AND TRADEMARK OFFICE
CERTIFICATE OF CORRECTION

PATENT NO.        : 7,357,358 B2
APPLICATION NO.   : 10/789100
DATED             : April 15, 2008
INVENTOR(S)       : Lacy et al.

It is certified that error appears in the above-identified patent and that said Letters Patent is hereby corrected as shown below:

In column 4, line 66, after "shown as" delete "a" and insert -- α --, therefor.

In column 12, line 5, in Claim 7, delete "where in" and insert -- wherein --, therefor.

In column 12, line 35, in Claim 11, delete "reguired" and insert -- required --, therefor.

Signed and Sealed this

Second Day of September, 2008

JON W. DUDAS
*Director of the United States Patent and Trademark Office*